C. C. HARBRIDGE.
DEMOUNTABLE RIM.
APPLICATION FILED JULY 3, 1916.

1,328,731.

Patented Jan. 20, 1920.

Witness:
John Enders

Inventor:
Chester C. Harbridge
by Fred Gerlach
his Atty.

UNITED STATES PATENT OFFICE.

CHESTER C. HARBRIDGE, OF DETROIT, MICHIGAN.

DEMOUNTABLE RIM.

1,328,731.     Specification of Letters Patent.      Patented Jan. 20, 1920.

Application filed July 3, 1916. Serial No. 107,226.

*To all whom it may concern:*

Be it known that I, CHESTER C. HARBRIDGE, a citizen of the United States, and a resident of Detroit, in the county of Wayne and State of Michigan, have invented certain new and useful Improvements in Demountable Rims, of which the following is a full, clear, and exact description.

The invention relates to demountable rims and more particularly to devices for removably securing the rims on the wheel-bodies.

It is now common practice to employ lugs having wedge-tongues adapted to be forced between the felly band and the demountable rim to secure the rim on the band. These wedge lugs in being forced into operative position tend to spread apart the band and rim, and have not been applied to wire wheels, because the felly of such a wheel is not particularly adapted to resist the inward stresses because the felly is held by wire spokes under tension, which construction is not especially adapted to resist compression stresses. In transversely split demountable rims for wooden wheels, these wedge-lugs tend to expand the rim under the limit permitted by the rim-end locking devices and therefore, exert severe stresses upon such locking devices.

The primary object of the invention is to provide a rim in which securing lugs are utilized to force the rim and band together as contra-distinguished from wedging them apart. This makes it possible to utilize these securing devices on wire wheels because the wedging apart of the rim and band is avoided. In transversely split rims for wood-wheels, these devices are of advantage, because the rim is drawn toward the band which tends to relieve the rim-end locking device of tensile stresses and to force the ends into abutting contact.

The invention consists in the several novel features hereinafter set forth and more particularly defined by claims at the conclusion hereof.

Figure 1:
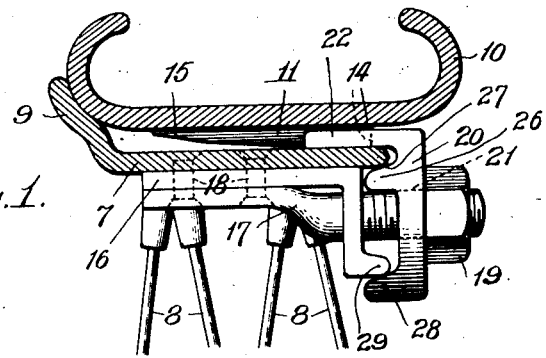
Figure 2:
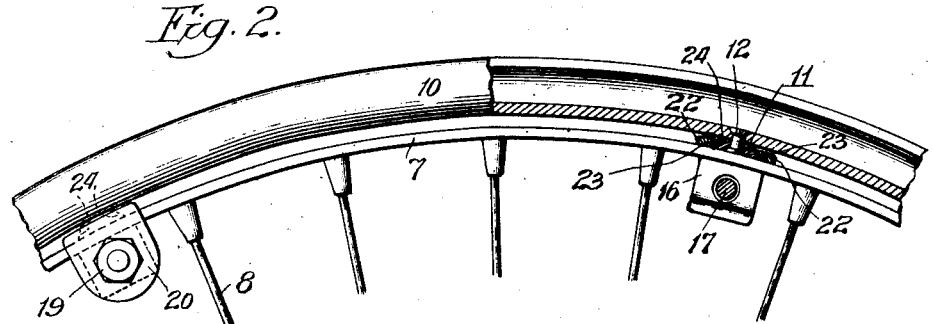
Figure 3:
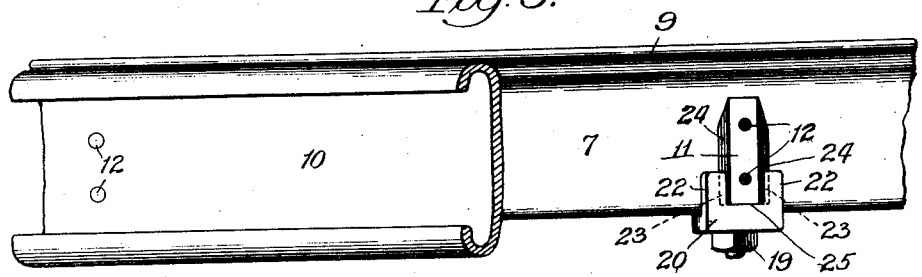
Figure 4:
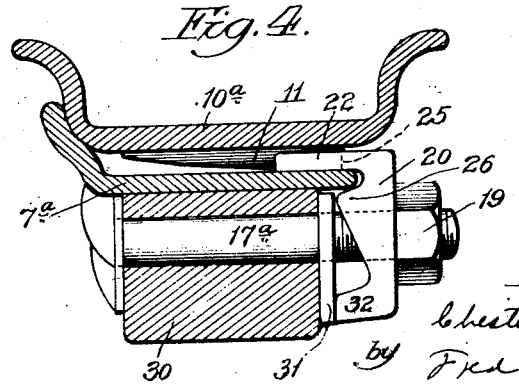

In the drawings: Figure 1 is a transverse section of a wire wheel embodying the invention. Fig. 2 is a view partly in elevation and partly in section. Fig. 3 is a plan, a portion of the rim being broken away. Fig. 4 is a section of a wood wheel embodying the invention.

In the exemplification of the invention in Figs. 1 to 3, 7 denotes the fixed band or rim of the wheel secured to the wheel hub by wire spokes 8. The band is provided at one side with a flange 9 which forms a seat for one side of a demountable tire rim 10 of the clencher type. Plates 11 in desired number are secured by rivets 12 to the inner face of the rim 10. The outer portions of these plates are of sufficient thickness as indicated at 14 to substantially fill the gap between the outer periphery of band 7 and the inner periphery of the rim 10 to act as supports or spacing elements between the band and the rim at the side opposite to flange 9. The inner portion of each plate 11 is inclined or beveled, as at 15, to permit the demountable rim to be tilted laterally in placement on and removal from the band 7. The tire valve usually projects inwardly from the demountable rim and the transverse angling of the rim is necessary to insert this valve in the hole usually provided for it in the band 7 and after the tire valve has been placed in the rim, the diametrically opposite portion of the rim is swung inwardly into position on the band. The inclined portions 15 permit this angling of the rim relatively to the band.

Brackets 16 and bolts 17 in desired number are secured to the inner face of band 7 by rivets 18. The bolts 17 are extended laterally through brackets 16 to one side of the band and are provided with screw-threads for the nuts 19. A lug 20, bolt 17 and bracket 16 are provided for each plate 11. Lug 20 has a hole 21 therein through which the bolt 17 is adapted to pass. The outer end of lug 20 is provided with an inwardly extending fork or a pair of separated arms 22, the inner sides of which are beveled or undercut as at 23, to engage and interlock with the correspondingly beveled side-edges 24 of the supporting plates 11. Lug 20 has a surface 25 which is adapted to engage the outer end of supporting plate 11 to force the rim laterally against its seat on flange 9. Lug 20 is also provided with an abutment 26 on its inner face which is adapted to engage the band 7, as at 27, and with a rib 28 adapted to pass beneath and engage a rib 29 on the bracket 16. The upper surfaces of ribs 26 and 28 are inclined in such a direction so that as the lug 20 is forced inwardly there will be a slight inward draw on the arms 22 to cause the bearing plate 11 and the band 7 to be forced together. To allow for slight variation in the spacing of the plates 11 on the rim, hole 21 may be elongated as shown in Fig. 2.

In applying the rim to the wheel, lugs 20 and nuts 19 are removed from bolts 17. The tire valve (not shown) on the demountable rim will first be dropped into the hole formed in the band, while the rim with the tire thereon is inclined transversely and after the valve has passed through the hole, the oppositely disposed portion of the rim can be pushed onto the band. Next, the lugs 20 are placed on the bolts 17, arms 22 straddling the plate 11 and riding inwardly on the contiguous beveled faces 23 and 24. When the nut 19 is turned to force the lug 20 inwardly, the inclined ribs 26 and 28 will draw the rim and band toward each other or together, the plate 11 acting as a support and spacer between them. The abutment 25 on the lug will engage the end of plate 11 and force the plate and the demountable rim laterally so that one side of the rim will be secured on the seat on the flange 9.

Fig. 4 illustrates a modified form of the invention in which the metallic band 7ª is secured on a wooden felly 30 and bolts 17ª are secured in the felly in usual manner. The demountable rim 10ª is provided with supporting and spacer plates 11 similar to those described in connection with Figs. 1 to 3. Bearing plates 31 are secured to one side of the felly and lugs 20 are provided with arms 22 and an abutment surface 25 the same as in the Figs. 1–3 construction. The lug is also provided with a rib 26 for engaging one side of the edges of the band 7. The lower end of the lug 20ª is provided with a rib 32 adapted to bear against plate 31. When the nut 19 is turned to force the lug 20ª inwardly, the rib 26 will exert a pull on arms 22 to draw the rim and band together with the spacer plate 11 therebetween and the abutment surface 25 will engage the ends of plates 11 to force the rim firmly into its seat on flange 9.

The invention thus exemplifies an improved wheel with a demountable rim in which the securing devices or lugs are constructed and applied to draw the band and rim together in lieu of wedging them apart, and also one which is particularly applicable to wire-wheels.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. The combination with a wheel body, comprising a metallic band, of a demountable tire rim, securing members fixed on the inner periphery of the rim, laterally movable rim-securing lugs having means for directly engaging the members and the band to draw the members on the rim and band together radially and means for forcing the lugs laterally into operative position.

2. The combination with a wheel body comprising a band having a flange at one side, of a demountable tire rim having one of its sides seated on said flange, members fixed to the inner periphery of the rim and disposed between the band and the rim, laterally movable rim-securing lugs having means for directly engaging the members and the band and adapted to draw said members and band together radially and means for forcing the lugs laterally into operative position.

3. The combination with a wheel body comprising a band, of a demountable tire rim having plates secured to its inner periphery and adapted to seat upon the band, rim securing lugs, nuts for operating said lugs, and means for drawing the lugs to draw the rim and band together, said lugs and plates having interfitting edges.

4. The combination with a wheel body having a band thereon of a demountable rim adapted to be seated on the band and having plates secured to its inner periphery, rim-securing lugs, said lugs and plates having interfitting beveled edges, means for securing the lugs against outward movement relatively to the band, and means for operating said lugs.

5. The combination with a wheel body having a band with a flange at one side of a demountable rim adapted to be seated on the band and having plates secured to its inner periphery, rim-securing lugs each having a pair of arms to engage the edges of said plates, said arms and plates having beveled interfitting edges, means on the lugs for engaging the band to secure them against outward movement relatively to the band, and means for operating said lugs.

6. The combination with a wheel body having a band thereon of a demountable rim adapted to be seated on the band and having plates secured to its inner periphery, of rim-securing lugs having means to engage the edges of said plates, said arms and plates having interfitting edges, means on the lugs whereby they will be secured against outward movement relatively to the band, bolts on said body, and nuts on said bolts for operating said lugs, said lugs having laterally extending slots for said bolts.

7. The combination with a wheel body, comprising a band, a demountable tire rim, members secured to the inner periphery of the rim and adapted to seat upon the band, rim-securing lugs provided with means for engaging the members and the band to force the rim and band together radially, bolts, means extending radially through the band and the bolts for securing the bolts to the band and nuts on the bolts for operating the lugs.

8. The combination of a wheel body comprising a band, brackets secured on the band, a demountable tire rim having plates secured thereto and adapted to seat upon the band and space the rim from the band, lugs provided with means for engaging the plates to hold the rim on the band and force them together, means between the lugs and the bracket for drawing the lugs to force the band and rim together, and means for operating said lugs.

9. The combination of a wheel body comprising a band, a demountable tire rim having plates secured to its inner periphery adapted to seat upon the band and space the rim from the band, securing lugs provided with means for engaging the plates to hold the rim on the band and force them together, means between the lugs and the body for drawing the lugs to force the rim and band together, said plates having their inner portions tapered to permit the rim to be transversely angled relatively to the band.

CHESTER C. HARBRIDGE.